United States Patent
Bruno et al.

(10) Patent No.: US 12,368,578 B2
(45) Date of Patent: Jul. 22, 2025

(54) SECRET MANAGEMENT IN DISTRIBUTED SYSTEMS USING PASSPHRASES

(71) Applicant: Dell Products L.P., Round Rock, TX (US)

(72) Inventors: Eric Joseph Bruno, Shirley, NY (US); Stav Sapir, Beer Sheva (IL); Maxim Balin, Gan-Yavne (IL); Bradley K. Goodman, Nashua, NH (US); Joseph Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 18/459,097

(22) Filed: Aug. 31, 2023

(65) Prior Publication Data

US 2025/0080329 A1  Mar. 6, 2025

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3226* (2013.01)

(58) Field of Classification Search
CPC .... H04L 9/0825; H04L 9/0861; H04L 9/3226
See application file for complete search history.

(56) References Cited

U.S. PATENT DOCUMENTS

| | | | | |
|---|---|---|---|---|
| 9,680,805 B1* | 6/2017 | Rodgers | .................. | G06F 16/84 |
| 10,963,593 B1* | 3/2021 | Campagna | ............ | H04L 9/0861 |
| 11,405,200 B1* | 8/2022 | Hamel | .................. | H04L 9/0822 |
| 2008/0120504 A1* | 5/2008 | Kirkup | .................... | H04L 9/003 |
| | | | | 713/176 |
| 2009/0327746 A1* | 12/2009 | Greco | ....................... | H04L 9/14 |
| | | | | 713/189 |
| 2013/0145170 A1* | 6/2013 | Rese | ........................ | G06F 21/40 |
| | | | | 713/183 |
| 2016/0323105 A1* | 11/2016 | Lee | ......................... | H04L 9/0863 |
| 2017/0142082 A1* | 5/2017 | Qian | ......................... | G06F 21/62 |
| 2018/0012032 A1* | 1/2018 | Radich | ..................... | H04L 9/30 |
| 2018/0375655 A1* | 12/2018 | Thom | ................... | H04L 9/0825 |
| 2020/0274699 A1* | 8/2020 | Watson | ................. | H04L 9/3249 |
| 2022/0103356 A1* | 3/2022 | Be'Ery | ...................... | H04L 9/50 |
| 2023/0388286 A1* | 11/2023 | Zeng | ..................... | H04L 9/3213 |

FOREIGN PATENT DOCUMENTS

EP      2110980 A2  * 10/2009  ........... H04L 9/0894

* cited by examiner

*Primary Examiner* — Darshan I Dhruv
(74) *Attorney, Agent, or Firm* — WOMBLE BOND DICKINSON (US) LLP

(57) ABSTRACT

Methods and systems for managing secrets are disclosed. To manage secrets, backups of the secrets may be obtained to facilitate future recoveries of the secrets. While backed up, the secrets may be protected with a security model. The security model may prescribe how decryption keys are maintained, and how various copies of the backed up secrets are to be separated from the decryption keys for encrypted copies of the secrets. When access to a secret is lost, a recovery may be performed using a corresponding encrypted backup of the secret.

20 Claims, 8 Drawing Sheets

SECRET MANAGEMENT IN DISTRIBUTED SYSTEMS USING PASSPHRASES

FIELD

Embodiments disclosed herein relate generally to security. More particularly, embodiments disclosed herein relate to backing up secrets used by devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
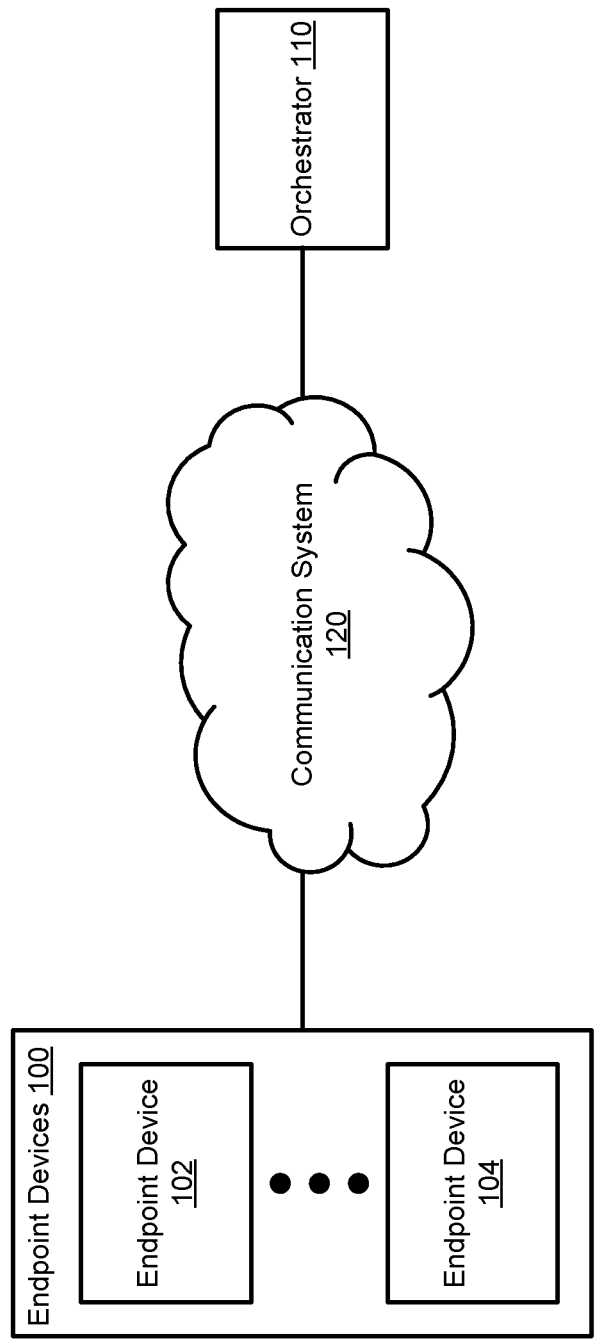
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for facilitating recovery of secrets. To facilitate recovery of secrets, backups of the secrets may be generated and escrowed (e.g., in a data vault) for future use.

During generation and while escrowed, a security model may be enforced. The security model may limit how decryption keys for the backups are retained. By doing so, undesired access to the secrets may be limited.

When access to a secret is lost, the backup may be used to restore access. To restore access, keys usable to access decryption keys for encrypted backups of the secrets may be dynamically generated and used to retrieve the decryption keys. Once retrieved and used to gain access to the secrets, the dynamically generated keys and accessible copies of the decryption keys may be discarded to comply with the security model.

Once accessible, the secrets may be deployed to a device. Once deployed, the secret may be used to facilitate, for example, access to data previously secured using the secret.

By doing so, embodiments disclosed herein may facilitate secure backup of secrets. Consequently, future access to secrets may be improved even when hardware components that otherwise safeguard the secrets become inoperable.

In an embodiment, a method for managing a secret in a distributed system is provided. The method may include identifying a restoration for the secret to a first endpoint device, the secret being previously used to secure data managed by a second endpoint device; based on the identified restoration: obtaining a first public key, the first public key being a member of a device keypair managed by the first endpoint device, the device keypair comprising the first public key and a first private key; obtaining a first instance of a symmetric key using a first instance of a user supplied passphrase; decrypting an encrypted second private key using the first instance of the user supplied passphrase to obtain the second private key, the second private key being a member of an escrow keypair, and the escrow keypair comprising the second private key and a second public key; decrypting the encrypted secret using the second private key to obtain the secret; encrypting the secret using the first public key to obtain a second encrypted secret; and recovering the secret to the first endpoint device using the second encrypted secret and the first private key.

The method may also include obtaining a salt used to generate a second instance of the symmetric key that was used to obtain the encrypted second private key. The instance of the symmetric key may also be obtained using the salt.

The method may also include obtaining the first instance of the user supplied passphrase from the user, the user having previously used the second endpoint device, and the user having provided a second instance of the user supplied passphrase to facilitate generation of the second instance of the symmetric key.

The secret may be a volume management key, and the data may be secured with encryption using the volume management key.

The method may further include, after recovering the secret, accessing the data using the volume management key.

Accessing the data may include installing the volume management key in a trusted platform module of the first endpoint device.

Recovering the secret to the first endpoint device may include providing the second encrypted secret to the first endpoint device; and decrypting the second encrypted secret using the first private key to obtain the secret.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and the method may be performed when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include endpoint devices 100. Each endpoint device (e.g., 102, 104) may provide similar and/or different computer implemented services, and may provide the computer implemented services independently and/or in cooperation with other endpoint devices.

When providing the computer implemented services, endpoint devices 100 may utilize secrets. The secrets may include symmetric and/or asymmetric keys. The secrets may be used, for example, to encrypt data stored in storage of endpoint devices 100, to create cryptographically verifiable signatures (e.g., to authenticate the endpoint device and/or state of operation of the endpoint device to another device), and/or for other purposes.

To manage the secrets, endpoint devices 100 may each include a trusted platform module (TPM) or other types of hardware devices for managing secrets. The TPM may limit use of the secrets based on the security posture of a host endpoint device. By doing so, the impact of a compromised endpoint device may be reduced by limiting and/or preventing use of the secrets by the compromised device.

However, if a TPM becomes damaged such that the secrets that it protects become unusable by the host endpoint device, then the ability of the endpoint device to provide the computer implemented services may be impacted. For example, the TPM may protect volume management keys (VMKs), which may be used to encrypt stored data. If the VMKs become unusable, then encrypted stored data may not be decrypted thereby limited access to the stored data. Secrets protected by TPMs may be used for other purposes without departing from embodiments disclosed herein.

Regardless of which secrets are unable to be used, the computer implemented services by vided by endpoint devices 100 may be impacted (e.g., may be prevented from providing some or all desired computer implemented services which depend on use of the secrets).

If secrets maintained by a TPM becomes unusable (due to impairment of the TPM and/or host endpoint device), the TPM may be replaced with a different TPM or the host endpoint device for the TPM may be replaced with another endpoint device having a different TPM. However, the different TPMs may not have the secrets protected by the now unusable TPM. Consequently, the different TPM may not facilitate use of the secrets necessary for the computer implemented services to be provided.

In general, embodiments disclosed herein may provide methods, systems, and/or devices for managing secrets used by endpoint devices. To manage the secrets used by the endpoint devices, backups of the secrets may be made and used to restore future use of the secrets.

However, to backup the secrets, the secrets may be exported from a TPM. Once exported, the exported secrets may not be protected by the TPM. Consequently, if obtained by a malicious entity, the secrets may be used to compromise various aspects of operation of a distributed system.

To reduce the likelihood of the exported secrets being obtained by malicious entities, the secrets may be managed in accordance with a security model. The security model may govern how secrets are to be managed. For example, the security model may require that (i) secrets be encrypted while not protected by a TPM, and (ii) decryption keys usable to decrypt encrypted secrets not be stored with the encrypted secrets in a manner that allows the decryption keys to be used without verification that an entity wishing to use the decryption keys is authorized to use the decryption keys. By meeting these requirements of the security model, the secrets exported from a TPM may be less likely to be obtained by a malicious entity.

To meet the requirements of the secret model, embodiments disclosed herein may protect decryption keys usable to decrypt encrypted secrets using passphrases. The passphrases may be (i) used to obtain symmetric keys used to secure the decryption keys, and (ii) only known to entities authorized to use the decryption keys.

When passphrases and corresponding symmetric keys are obtained, they may only be retained for a minimum time necessary to perform corresponding operations (e.g., decryption/encryption). Once the operations are performed, the copies of the passphrases and corresponding symmetric keys may be destroyed. Consequently, the passphrases and symmetric keys may not be stored or otherwise retained, thereby allowing for the requirements of the security model to be met.

By doing so, embodiments disclosed herein may manage secrets used by endpoint in a manner that reduces their likelihood of compromise while enabling the secrets to be recovered. Consequently, a distributed system in accordance with an embodiment may be more resilient to failures of devices and components thereof such as TPMs. For example, failures of such devices may be less likely to result in data loss by preserving access to VMKs even when the TPMs that protect them become inoperable.

To provide the above noted functionality, the system of FIG. 1 may include endpoint devices 100, orchestrator 110, and communication system 120. Each of these components is discussed below.

Endpoint devices 100 may provide computer implemented services using one or more secrets. The secrets may be managed by TPMs which may become inaccessible. To reduce the impact of inaccessibility of the TPMs and/or devices that host the TPMs, endpoint devices 100 may participate in backup generation processes for the secrets. During the backup generation processes, endpoint devices 100 may (i) export and encrypt the secrets using public keys of escrow keypairs, and (ii) provide the encrypted secrets to orchestrator 110 (and/or other entities) for long term retention. By doing so, a backup of the secret may be established.

Endpoint devices 100 may also participate in recovery processes for secrets. During the recovery processes, endpoint devices 100 (e.g., acting as a new endpoint device for a secret) may (i) establish device keypairs and provide copies of public keys of the device keypairs to other devices to secure secrets during transport (e.g., from orchestrator 110 to the new endpoint device), (ii) decrypt the encrypted secrets using the private keys of the device keypairs to obtain the secrets, and (iii) use the obtained secrets to perform various processes. For example, once obtained, the secrets may be entrusted to a secret manager (e.g., a TPM) for retention, the secret may be used to decrypt encrypted data (e.g., previously encrypted using the secrets), authenticate the endpoint device to other devices, and/or otherwise be used in various cryptographic operations. Endpoint devices 100 may include any number of endpoint devices (e.g., 102-104). Refer to FIGS. 2A-2D for additional details regarding participation of endpoint devices 100 in backup and recovery operations.

Orchestrator 110 may participate in backups and recovery operations for secrets of endpoint devices 100. When participating in backup operations, orchestrator 110 may (i) generate escrow keys, (ii) use passphrases and salts to obtain symmetric keys, (iii) encrypt private keys of escrow keys using the symmetric keys and escrow the encrypted private keys and salts used to obtain the symmetric keys, (iv) provide public keys of the escrow keys to endpoint devices 100 to facilitate encrypting of secrets of endpoint devices 100 and archive the public keys for future use, and (v) archive copies of the encrypted secrets for future use. By doing so, backups of the secrets may be established.

When participating in recovery of operations, orchestrator may (i) regenerate symmetric keys by obtaining the passcode again along with the previously used salts, (ii) decrypt encrypted private keys of escrow keypairs, (iii) use the decrypted private keys to decrypt encrypted secrets, (iv) re-encrypt the decrypted secrets using public keys of device keypairs, and (v) provide the re-encrypted decrypted secrets to endpoint devices corresponding to the device keypairs to facilitate restoration of the secrets to the endpoint devices. Refer to FIGS. 2A-2D for additional details regarding participation of orchestrator 110 in backup and recovery operations.

Figure 3A:
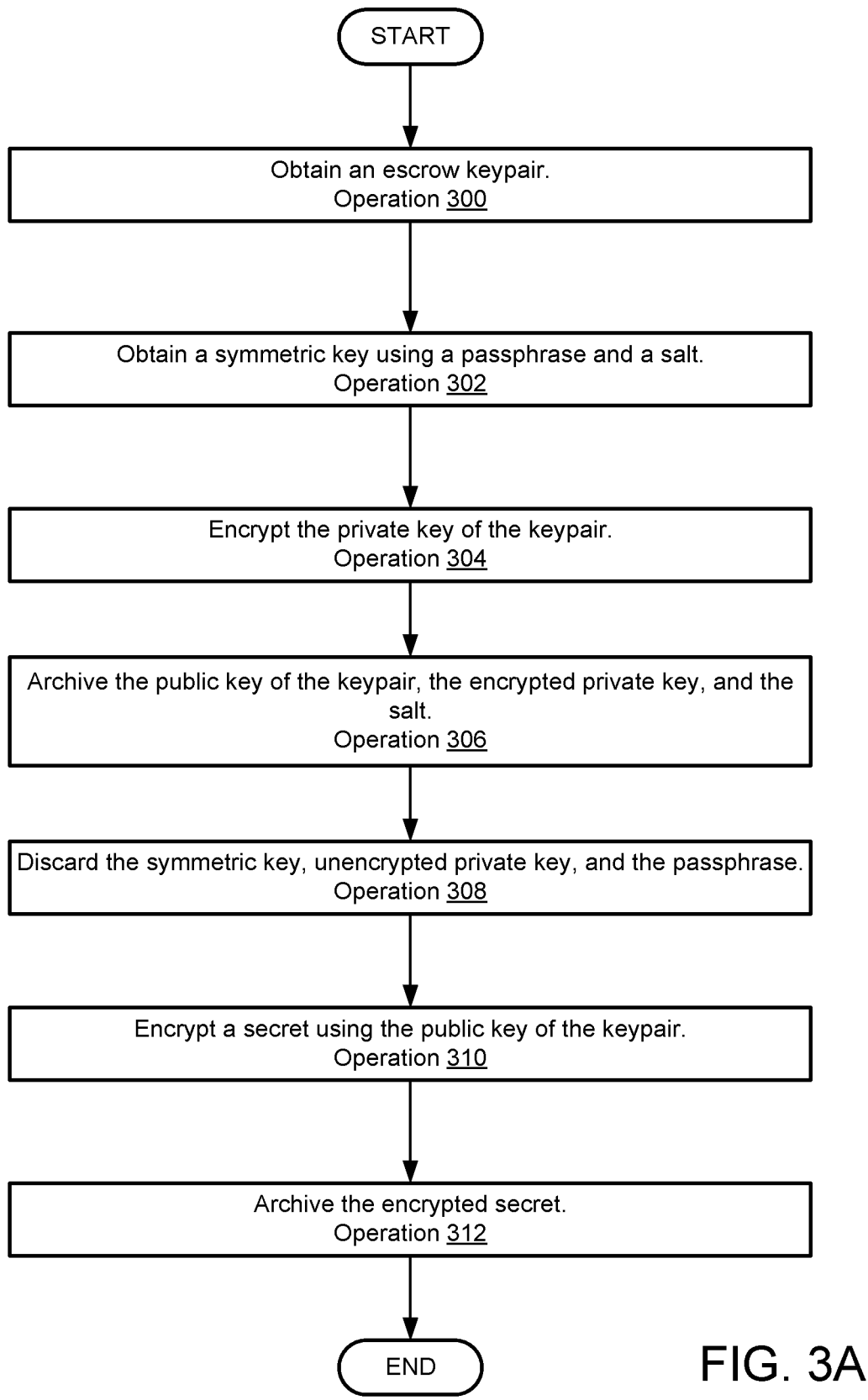
FIG. 3A-3B show flow diagrams illustrating methods in accordance with an embodiment.
Figure 3B:
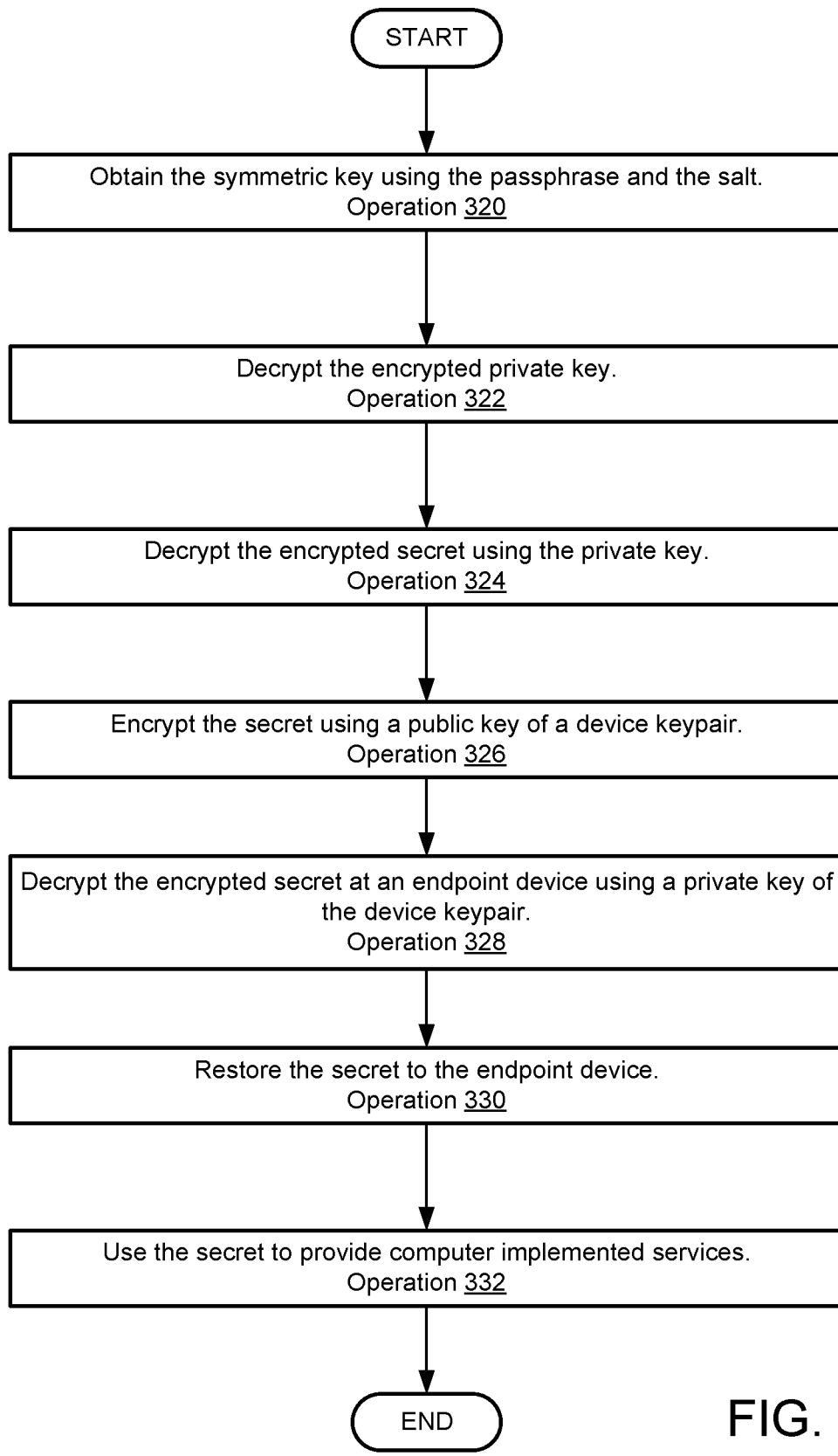

When providing their functionality, any of (and/or components thereof) endpoint devices 100, orchestrator 110, and/or other components may perform all, or a portion, of the methods illustrated in FIGS. 3A-3B.

Any of (and/or components thereof) endpoint devices 100 and orchestrator 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those components illustrated therein.

To further clarify embodiments disclosed herein, interactions diagrams in accordance with an embodiment are shown in FIGS. 2A-2D. These interactions diagrams may illustrate how data may be obtained and used within the system of FIG. 2A-2D.

In the interaction diagrams, processes performed by and interactions between components of a system in accordance with an embodiment are shown. In the diagrams, components of the system are illustrated using a first set of shapes (e.g., 102, 104, etc.), located towards the top of each figure. Lines descend from these shapes. Processes performed by the components of the system are illustrated using a second set of shapes (e.g., 202, 204, etc.) superimposed over these lines. Interactions (e.g., communication, data transmissions, etc.) between the components of the system are illustrated using a third set of shapes (e.g., 220, 224, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 220 may occur prior to the interaction labeled as 224. However, it will be appreciated that the processes and interactions may be performed in different orders, any may be omitted, and other processes or interactions may be performed without departing from embodiments disclosed herein.

Figure 2A:
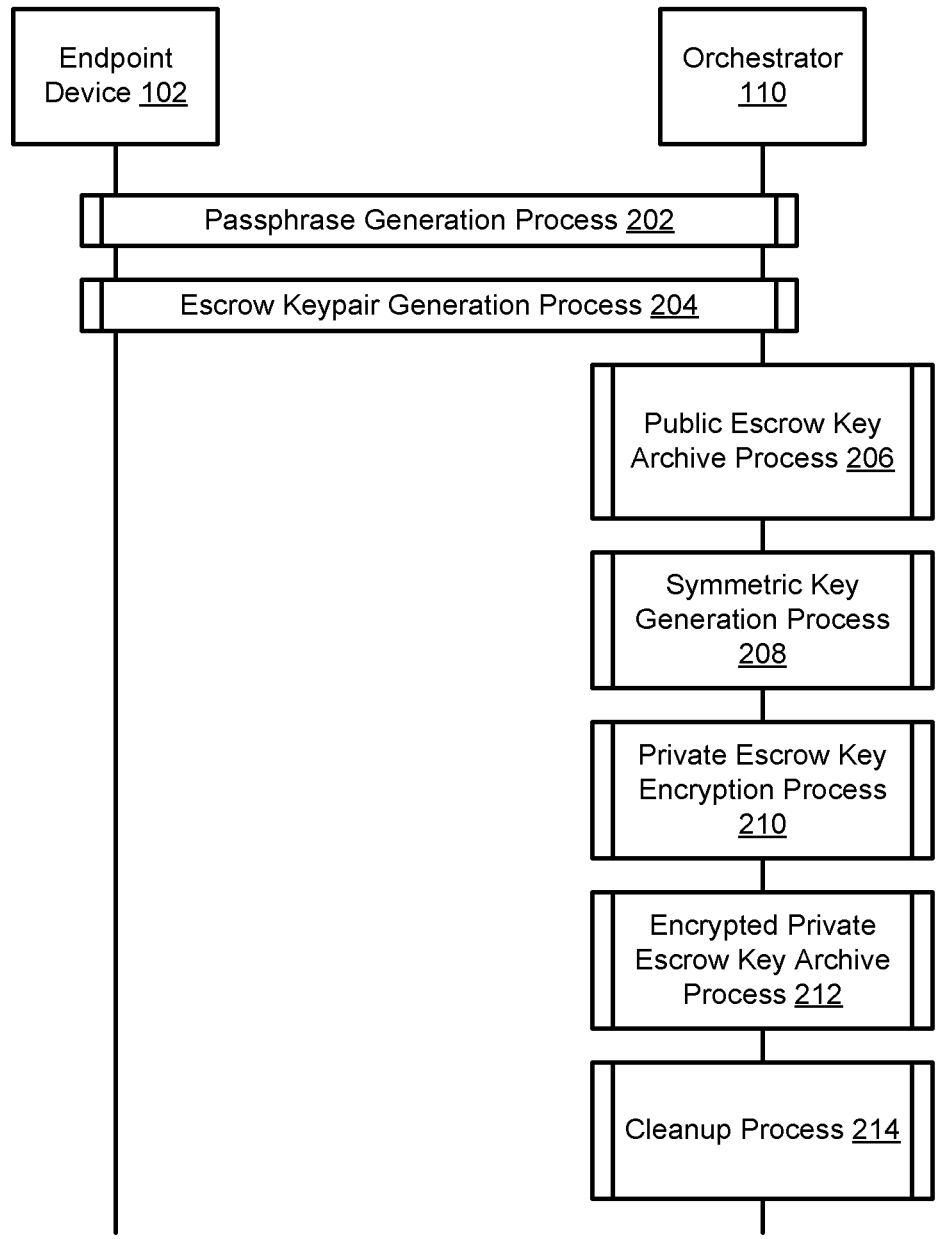
FIGS. 2A-2D show interaction diagrams in accordance with an embodiment.

Turning to FIG. 2A, a first interaction diagram in accordance with an embodiment is shown. The first interaction diagram may illustrate processes and interactions that may occur during preparation for backup of a secret managed by a trusted platform module of an endpoint device.

To prepare to perform the backup, endpoint device 102 and orchestrator 110 may perform passphrase generation process 202. During passphrase generation process 202, a passphrase may be generated. The passphrase may be generated by having a user utter a passphrase, enter the passphrase, and/or otherwise provide user input to obtain the passphrase. The user input may be obtained via an interface provided to the user via endpoint device 102, orchestrator 110, or another device operably connected to endpoint device 102 and/or orchestrator 110.

Once the passphrase is obtained, escrow keypair generation process 204 may be performed. During escrow keypair generation process 204, a key derivation function may be used to obtain an escrow keypair. The escrow keypair may be a public private keypair usable for various cryptographic operations. Additionally, a salt may be generated. The salt may be based on a security standard, or other standard. The salt may be of a length based on the security standard. The salt may be generated using any method (e.g., random number generator).

Once the escrow keypair is obtained, public escrow key archive process 206 may be performed. During public escrow key archive process 206, the public key of the escrow keypair and the salt may be archived (e.g., in a data vault or other type of repository). As will be discussed in great detail below, the public key may be used to protect secrets during transmission between endpoint devices and orchestrator 110, and during storage in orchestrator 110.

After archiving the public key, symmetric key generation process 208 may be performed. During symmetric key generation process 208, the passphrase and the salt may be used to obtain a symmetric key. The symmetric key may be obtained using a key derivation function that ingests the passphrase and the salt, and outputs the symmetric key.

Once the symmetric key is obtained, private escrow key encryption process 210 may be performed. During private escrow key encryption process 210, the private key of the escrow keypair may be encrypted using the symmetric key.

Once the encrypted symmetric key is obtained, encrypted private key archive process 212 may be performed. During encrypted private key archive process 212, the encrypted symmetric key may be stored in the data vault, or other type of repository.

Once the encrypted private key, the salt, and the public key of the escrow keypair are stored in the data vault, cleanup process 214 may be performed. During cleanup process, the passphrase, private key (e.g., unencrypted version), and the symmetric key may be discarded or otherwise removed. By doing so, encrypted private key may not be decryptable using information available to orchestrator 110 thereby ensuring that any secrets encrypted using the public key of the escrow keypair are not decryptable using information available to orchestrator 110. Consequently, secrets encrypted using the escrow keypair public key may be archived by orchestrator 110 without violating the security model.

Figure 2B:
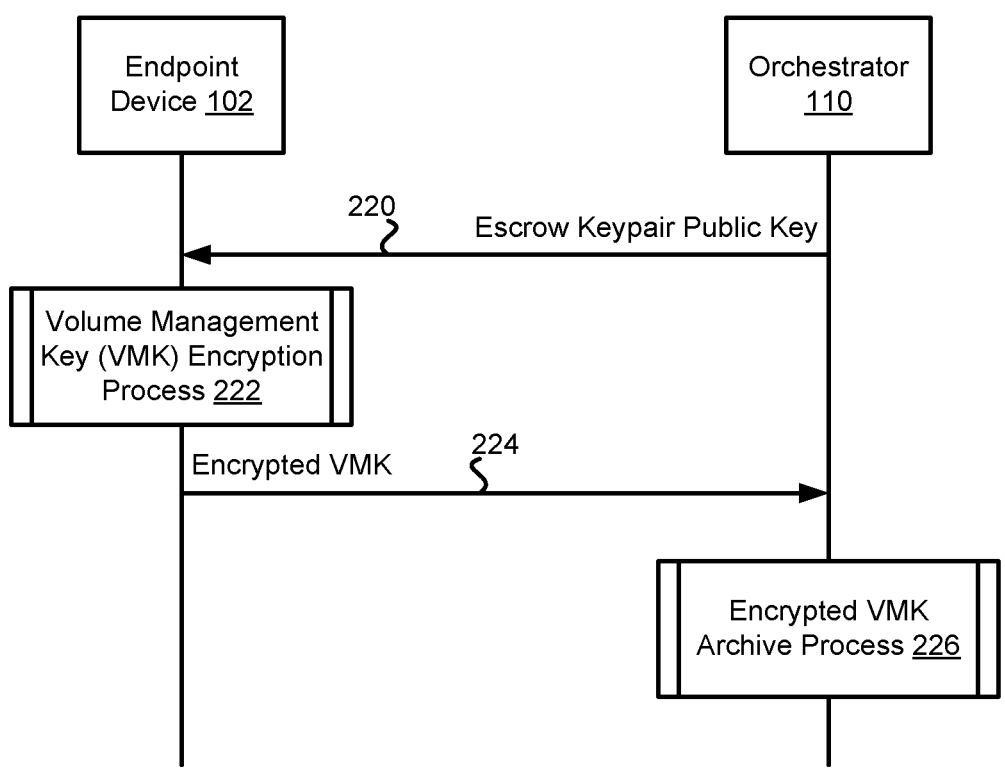

Turning to FIG. 2B, a second interaction diagram in accordance with an embodiment is shown. The second interaction diagram may illustrate processes and interactions that may occur during backup of a secret managed by a trusted platform module of an endpoint device.

Prior to interaction 220, an entity may request that a backup of a secret such as a volume management key maintained by a trusted platform module of endpoint device 102 be backup up. To backup the secret, orchestrator 110 may provide the escrow keypair public key (e.g., from the data vault) to endpoint device 102.

Once obtained, endpoint device 102 may perform volume management key (VMK) encryption process 222. During VMK encryption process 222, the trusted platform module (TPM) of endpoint device 102 may encrypt the VMK (or other secret) using the escrow keypair public key and export the encrypted VMK. Endpoint device 102 may have used the VMK for various purposes such as, for example, securing stored data by encrypting the data using the VMK.

Once exported, at interaction 224, the encrypted VMK may be provided to orchestrator 110.

Once obtained, orchestrator 110 may perform encrypted VMK archive process 226. During encrypted VMK archive process 226, the encrypted VMK may be stored in the data repository for retention.

Accordingly, the VMK of the TPM of endpoint device 102 may be backup by orchestrator 110. The backed up copy of the VMK may be encrypted, and orchestrator 110 may not have access to the key (e.g., the escrow keypair private key) necessary to decrypt the encrypted VMK. Thus, orchestrator 110 may continue to comply with the security model.

Once the VMK is archived, the TPM that previously maintained the VMK may be damaged. Consequently, the data (and other uses for the VMK) encrypted using the VMK may no longer be accessible. To gain access to the data, the TPM may be replaced or a different endpoint device with a different TPM may be utilized by restoring the VMK to the new TPM using the backup copy of the VMK in orchestrator 110.

Figure 2C:
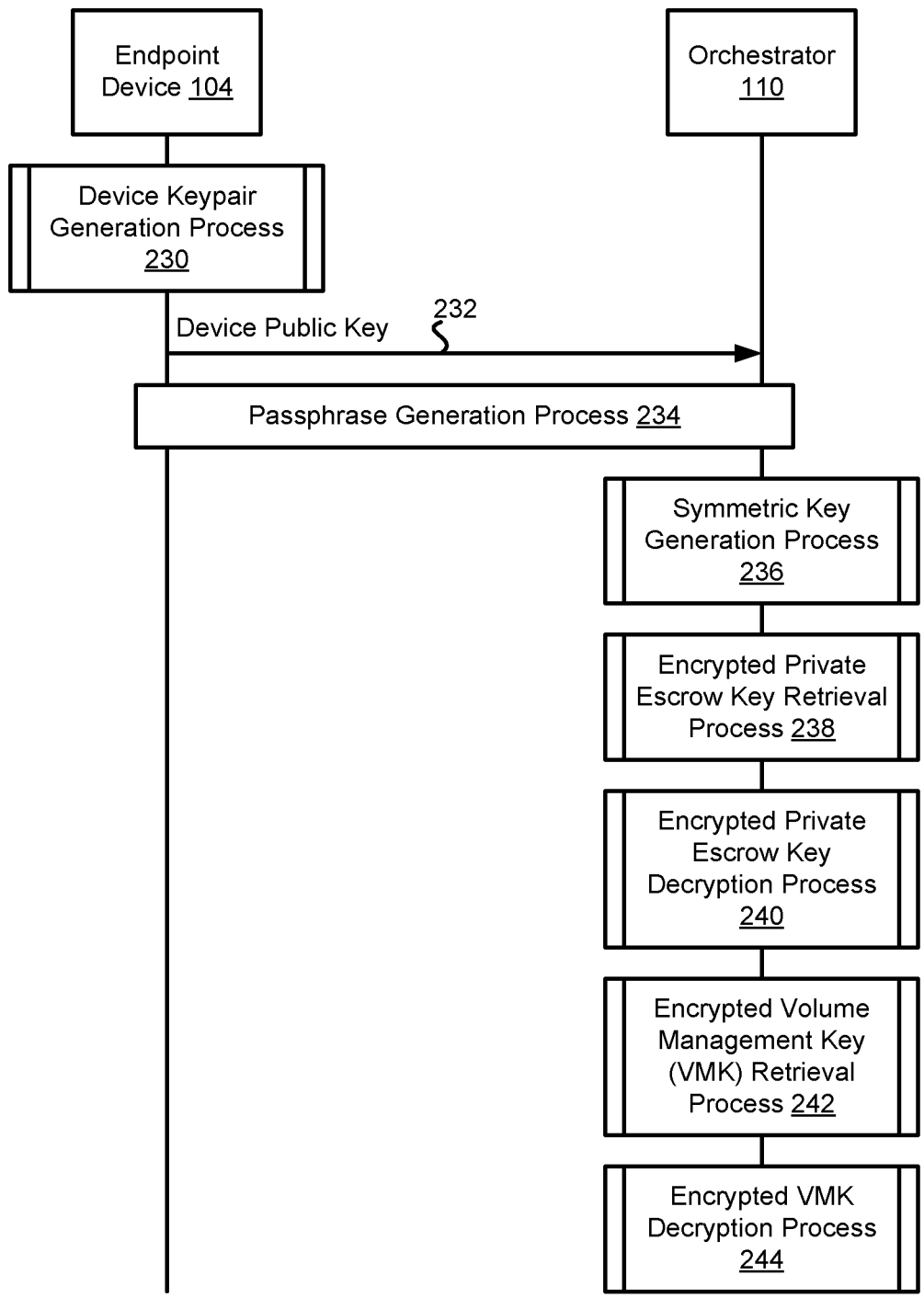

Turning to FIG. 2C, a third interaction diagram in accordance with an embodiment is shown. The third interaction diagram may illustrate processes and interactions that may occur during restoring of a VMK to an endpoint device.

Now, consider an example scenario where endpoint device 104 is selected for restoration of the VMK. For example, endpoint device 104 may be an existing endpoint device or may be a newly obtained endpoint device that may be onboarded to a domain as a replacement of an endpoint device that has failed. The data from endpoint device 102 may be migrated to endpoint device 104 (e.g., using backup or other mechanisms, not shown). However, the data may be encrypted and access to the VMK may be required to access the data. To facilitate access to the data, endpoint device 104 may perform device keypair generation process.

During device keypair generation process 230, a device keypair may be obtained (e.g., through generation). The device keypair may include a public private keypair, similar to the escrow keypair but maintained by the TPM of endpoint device 104 rather than orchestrator 110.

Once obtained, at interaction 232, the public key of the device keypair may be provided to orchestrator 110.

Once obtained by orchestrator 110, passphrase generation process 234 may be performed. Passphrase generation process 234 may be similar to passphrase generation process 202. Both processes may solicit a same passphrase from the user (or users). Thus, the passphrase obtained from both processes should be identical (e.g., unless a user forgets the passphrase).

Once the passphrase is obtained, symmetric key generation process 236 may be performed. Symmetric key generation process 236 may be similar to symmetric key generation process 208. Thus, if the same passphrase and salt is used with the same key derivation function, the same symmetric key should be generated. In other words, the previously used symmetric key may be regenerated using a secret (i.e., the passphrase) maintained by the user. The salt, previously archived, may be retrieved and used to regenerate the symmetric key.

Once the symmetric key is obtained, encrypted private key retrieval process 238 may be performed. During encrypted private key retrieval process 238, the encrypted private key of the escrow key pair may be obtained from the data vault (e.g., read).

Once the encrypted private key of the escrow keypair is obtained, encrypted private escrow key decryption process 240 may be performed. During encrypted private escrow key decryption process 240, the encrypted private key of the escrow keypair may be decrypted using the now-regenerated symmetric key to obtain access to the private key of the escrow keypair.

Once obtained, encrypted VMK retrieval process 242 may be performed. During encrypted VMK retrieval process 242, the encrypted VMK may be obtained from the data vault.

Once the encrypted VMK is obtained from the data vault, encrypted VMK decryption process 244 may be performed. During encrypted VMK decryption process 244, the encrypted VMK may be decrypted using the private key of the escrow keypair obtained during private escrow key decryption process 240.

Figure 2D:
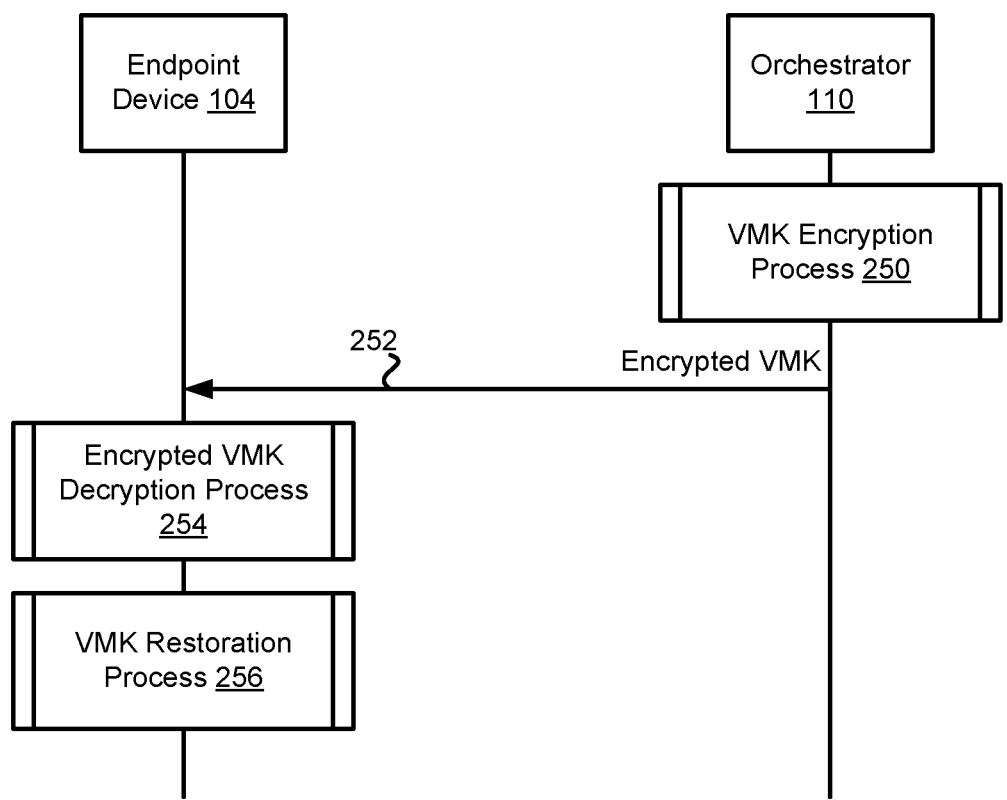

Turning to FIG. 2D, a fourth interaction diagram in accordance with an embodiment is shown. The fourth interaction diagram may be a continuation of the third interaction diagram.

Once the VMK is obtained, VMK encryption process 250 may be performed. During VMK encryption process 250, the VMK may be encrypted using the public key of the device keypair to obtain an encrypted VMK.

Once obtained, the encrypted VMK may, at interaction 252, be provided to endpoint device 104.

Once obtained by endpoint device 104, encrypted VMK decryption process 254 may be performed. During encrypted VMK decryption process 254, the encrypted VMK may be decrypted using the private key of the device keypair.

Once the VMK is obtained, VMK restoration process 256 may be performed. During VMK restoration process 256, the VMK may be added to the TPM of endpoint device 104.

Once added, the TPM may use the VMK to, for example, decrypt encrypted data, sign data structures, and/or perform other processes.

During the processes and interactions shown in FIGS. 2A-2D, orchestrator may discard data structures to maintain compliance with the security model. For example, once used, the instances of the symmetric key, passphrase, and unencrypted copies of the private key usable to decrypt encrypted VMKs may be discarded.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips). Additionally, any of the interactions may be performed in part using communications devices such as network interface cards, networks, etc.

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, as seen in FIGS. 2A-2D, embodiments disclosed herein may facilitate backup and recovery of secrets for endpoint devices. Throughout the backup process, a security model may be enforced that reduces the likelihood of secrets that are backed up from being compromised while not protected by secret managers such as SPMs. The security model may enforce separation between encrypted secrets and decryption keys required to access the secrets. Thus, the users may maintain some secrets (i.e., passphrases) to maintain separation between decryption keys (e.g., the symmetric keys) and encrypted secrets.

As discussed above, the components of FIG. 1 may perform various methods to manage the operation of and/or interactions between endpoint devices. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method for managing secrets in accordance with an embodiment is shown. The method may be performed by any of endpoint devices 100, orchestrator 110, and/or other components of the system shown in FIG. 1.

At operation 300, an escrow keypair may be obtained. The escrow keypair may be obtained through generation using a key derivation function, by reading the keypair from storage, by receiving the keypair from another device, and/or via other methods.

At operation 302, a symmetric key is obtained using a passphrase and a salt. The symmetric key may be obtained by ingesting the passphrase and the salt into a key derivation function, which may output the symmetric key. The passphrase may be obtained from a user. The salt may be generated in a manner consistent with security standards set by an organization.

At operation 304, the private key of the escrow keypair is encrypted using the symmetric key. Any encryption algorithm may be used, and may ingest the private key and the symmetric key (e.g., as a cypher or basis for a cypher).

At operation 306, the public key of the escrow keypair, the encrypted private key, and the salt are archived (e.g., stored for retention).

At operation 308, the passphrase, symmetric key, and unencrypted copy of the private key of the escrow keypair may be discarded (e.g., made unrecoverable/obtainable by an orchestrator through destruction).

At operation 310, a secret (e.g., maintained by a TPM) is encrypted using the public key of the keypair. The secret may be encrypted by (i) sending a copy of the public key of the escrow keypair to an endpoint device that hosts the TPM, (ii) providing the copy of the public key to the TPM, (iii) invoking an encryption function of the TPM using the public key, and (iv) receiving the encrypted secret from the TPM.

At operation 312, the encrypted secret is archived. The encrypted secret may be archived by sending a copy of the encrypted secret to an orchestrator for retention (and/or to another device that complies with the security model).

The method may end following operation 312.

Thus, using the method shown in FIG. 3A, a secret of an endpoint may be backed up for future use.

Turning to FIG. 3B, a second flow diagram illustrating a method for restoring a secret in accordance with an embodiment is shown. The method may be performed by any of endpoint devices 100, orchestrator 110, and/or other components of the system shown in FIG. 1.

At operation 320, a symmetric key is obtained using a passphrase and a salt (e.g., similar to operation 302). In other words, the symmetric key may be regenerated by obtaining a new instance of the passphrase from the user, and the archived copy of the salt.

At operation 322, the encrypted private key of the escrow keypair is decrypted using the symmetric key.

At operation 324, the encrypted secret is decrypted using the now-decrypted private key of the escrow keypair.

At operation 326, the secret is encrypted using a public key of a device keypair. The device keypair may be generated by an endpoint device to which the secret is to be restored. The endpoint device to which the secret is to be restored may send the public key of the device keypair to the orchestrator (or another device that decrypts the VMK).

At operation 328, the encrypted secret is decrypted at an endpoint device using a private key of the device keypair. The encrypted secret may be decrypted by (i) sending the encrypted VMK to the endpoint device, and (ii) using the private key of the device keypair to decrypt the VMK.

At operation 330, the secret is restored to the endpoint device. The secret may be restored by adding the secret to a TPM of the endpoint device (or otherwise placing the secret in a usable, but protected state).

At operation 332, the restored secret is used to provide computer implemented services. For example, the restored secret may be used to decrypt encrypted data, which may be used in the computer implemented services. Also, the restored secret may be used to sign data structures, and/or perform other types of cryptographic operations as part of the computer implemented services.

The method may end following operation 332.

Thus, using the method shown in FIG. 3B, embodiments disclosed herein may facilitate restoration of secrets thereby enabling computer implemented services to be provided.

Figure 4:
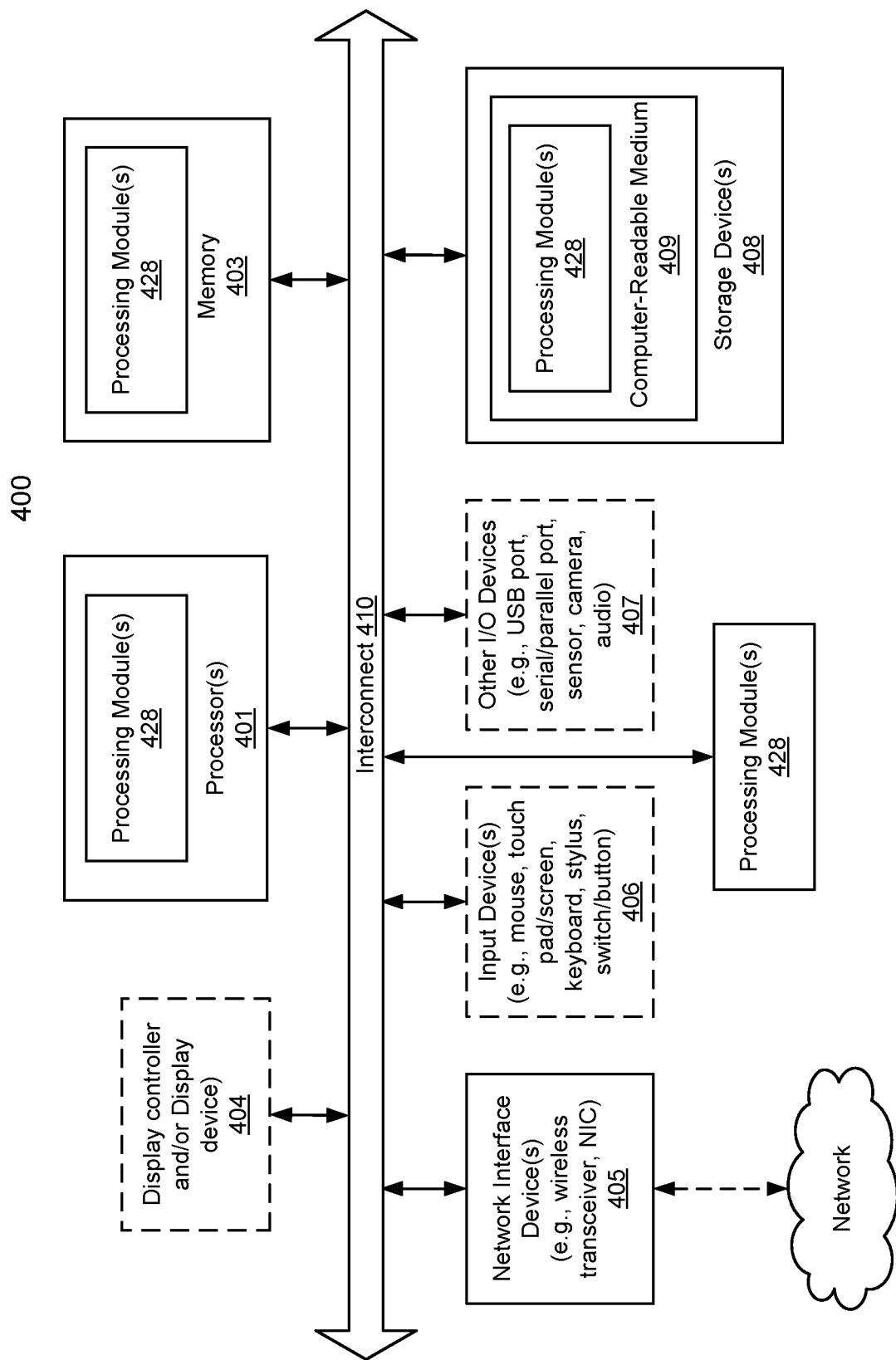
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a secret in a distributed system comprising at least a first endpoint device, a second endpoint device, and an orchestrator, the method comprising and by the orchestrator:
obtaining a first public key, the first public key being a member of a device keypair managed by the first endpoint device, the device keypair comprising the first public key and a first private key;
obtaining a first instance of a symmetric key using a first instance of a user supplied passphrase;
decrypting an encrypted second private key using the symmetric key to obtain the second private key, the second private key being a member of an escrow keypair, and the escrow keypair comprising the second private key and a second public key;
decrypting the encrypted secret using the second private key to obtain the secret;
encrypting the secret using the first public key to obtain a second encrypted secret; and
causing the first endpoint device to recover the secret using the second encrypted secret and the first private key by at least transmitting the second encrypted secret to the first endpoint device in order for the first endpoint device to regain access to data managed by the second endpoint device that is secured by the secret, the secret being lost by the first endpoint device prior to the obtaining of the first public key.

2. The method of claim 1, further comprising:
obtaining a salt used to generate a second instance of the symmetric key that was used to obtain the encrypted second private key,
wherein the instance of the symmetric key is also obtained using the salt.

3. The method of claim 2, further comprising:
obtaining the first instance of the user supplied passphrase from the user, the user having previously used the second endpoint device, and the user having provided a second instance of the user supplied passphrase to facilitate generation of the second instance of the symmetric key.

4. The method of claim 1, wherein the secret is a volume management key, and the data is secured with encryption using the volume management key.

5. The method of claim 4, wherein the first endpoint device accesses the data by installing the volume management key in a trusted platform module of the first endpoint device.

6. The method of claim 1, wherein
the first endpoint device decrypts the second encrypted secret using the first private key to obtain the secret.

7. A non-transitory machine-readable medium having instructions stored therein, which when executed by at least one processor, cause a system to perform first operations for managing a secret in a distributed system comprising a first endpoint device, a second endpoint device, and the system, the first operations comprising:
obtaining a first public key, the first public key being a member of a device keypair managed by the first endpoint device, the device keypair comprising the first public key and a first private key;
obtaining a first instance of a symmetric key using a first instance of a user supplied passphrase;
decrypting an encrypted second private key using the symmetric key to obtain the second private key, the second private key being a member of an escrow keypair, and the escrow keypair comprising the second private key and a second public key;
decrypting the encrypted secret using the second private key to obtain the secret;
encrypting the secret using the first public key to obtain a second encrypted secret; and
causing the first endpoint device to recover the secret using the second encrypted secret and the first private key by at least transmitting the second encrypted secret to the first endpoint device in order for the first endpoint device to regain access to data managed by the second endpoint device that is secured by the secret, the secret being lost by the first endpoint device prior to the obtaining of the first public key.

8. The non-transitory machine-readable medium of claim 7, wherein the operations further comprise:
obtaining a salt used to generate a second instance of the symmetric key that was used to obtain the encrypted second private key,
wherein the instance of the symmetric key is also obtained using the salt.

9. The non-transitory machine-readable medium of claim 8, wherein the operations further comprise:
obtaining the first instance of the user supplied passphrase from the user, the user having previously used the second endpoint device, and the user having provided a second instance of the user supplied passphrase to facilitate generation of the second instance of the symmetric key.

10. The non-transitory machine-readable medium of claim 7, wherein the secret is a volume management key, and the data is secured with encryption using the volume management key.

11. The non-transitory machine-readable medium of claim 10, wherein the first endpoint device accesses the data by installing the volume management key in a trusted platform module of the first endpoint device.

12. The non-transitory machine-readable medium of claim 7, wherein
the first endpoint device decrypts the second encrypted secret using the first private key to obtain the secret.

13. A data processing system, comprising:
a processor; and
a memory coupled to the processor to store instructions, which when executed by the processor, cause the data processing system to perform operations for managing a secret in a distributed system comprising a first endpoint device, a second endpoint device, and the data processing system, the operations comprising:
obtaining a first public key, the first public key being a member of a device keypair managed by the first endpoint device, the device keypair comprising the first public key and a first private key;
obtaining a first instance of a symmetric key using a first instance of a user supplied passphrase;
decrypting an encrypted second private key using the symmetric key to obtain the second private key, the second private key being a member of an escrow keypair, and the escrow keypair comprising the second private key and a second public key;
decrypting the encrypted secret using the second private key to obtain the secret;
encrypting the secret using the first public key to obtain a second encrypted secret; and causing the first endpoint device to recover the secret using the second encrypted secret and the first private key by at least transmitting the second encrypted secret to the first endpoint device in order for the first endpoint device to regain access to data managed by the second endpoint device that is secured by the secret, the secret being lost by the first endpoint device prior to the obtaining of the first public key.

14. The data processing system of claim 13, wherein the operations further comprise:

obtaining a salt used to generate a second instance of the symmetric key that was used to obtain the encrypted second private key, wherein the instance of the symmetric key is also obtained using the salt.

15. The data processing system of claim 14, wherein the operations further comprise:

obtaining the first instance of the user supplied passphrase from the user, the user having previously used the second endpoint device, and the user having provided a second instance of the user supplied passphrase to facilitate generation of the second instance of the symmetric key.

16. The data processing system of claim 13, wherein the secret is a volume management key, and the data is secured with encryption using the volume management key.

17. The data processing system of claim 16, wherein the first endpoint device accesses the data by installing the volume management key in a trusted platform module of the first endpoint device.

18. The data processing system of claim 13, wherein the first endpoint device decrypts the second encrypted secret using the first private key to obtain the secret.

19. The method of claim 1, further comprising:

obtaining the first instance of the user supplied passphrase from the user, the user having previously used the second endpoint device.

20. The non-transitory machine-readable medium of claim 7, wherein the operations further comprise:

obtaining the first instance of the user supplied passphrase from the user, the user having previously used the second endpoint device.

* * * * *